United States Patent
Chen et al.

(10) Patent No.: US 10,742,518 B2
(45) Date of Patent: Aug. 11, 2020

(54) SERVICE INDICATOR DISPLAY METHOD AND DEVICE

(71) Applicant: HUAWEI TECHNOLOGIES CO., LTD., Shenzhen, Guangdong (CN)

(72) Inventors: Junliang Chen, Shanghai (CN); Jun Zhang, Shanghai (CN); Chao Wang, Suzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 16/138,482

(22) Filed: Sep. 21, 2018

(65) Prior Publication Data
US 2019/0028358 A1    Jan. 24, 2019

Related U.S. Application Data

(63) Continuation of application No. PCT/CN2017/077782, filed on Mar. 23, 2017.

(30) Foreign Application Priority Data

Mar. 24, 2016    (CN) .......................... 2016 1 0176086

(51) Int. Cl.
*G06T 15/50*    (2011.01)
*H04L 12/24*    (2006.01)
(Continued)

(52) U.S. Cl.
CPC ............. *H04L 41/145* (2013.01); *G06T 15/04* (2013.01); *G06T 15/08* (2013.01); *G06T 19/00* (2013.01);
(Continued)

(58) Field of Classification Search
CPC ......... G06T 15/20; G06T 19/00; G06T 15/00; G06T 17/00; G06F 3/04815
(Continued)

(56) References Cited

U.S. PATENT DOCUMENTS 5,036,635 A * 8/1991 Lalvani .................. A63H 33/04
52/80.1
2010/0110074 A1 * 5/2010 Pershing ............. G06F 17/5004
345/423
(Continued)

FOREIGN PATENT DOCUMENTS

CN        101364310 A      2/2009
CN        101820646 A      9/2010
(Continued)

OTHER PUBLICATIONS

Anonymous, Wireless communication network optimization. Retrieved from http://math.ucas.ac.cn/mis/index.php/yjfx/wxtxwlyh, Oct. 27, 2018, 7 pages.
(Continued)

*Primary Examiner* — Gordon G Liu
(74) *Attorney, Agent, or Firm* — Fish & Richardson P.C.

(57) ABSTRACT

The present disclosure provides a service indicator display method and device. The method includes: obtaining measurement values of service indicators in a building and a three-dimensional grid model of the building, where an outer surface of the model includes multiple polygons; determining, according to the measurement values of the service indicators, a measurement value that is of a service indicator and that is corresponding to a vertex location of each polygon; performing gradient rendering on each polygon according to a legend and the measurement value, to obtain spatial distribution of the service indicators; and displaying the spatial distribution in the building. A surface of a building model is divided more finely by using a polygon, and spatial location distribution of service indicators is reflected more truly by means of gradient rendering, so as to improve network optimization efficiency.

20 Claims, 11 Drawing Sheets

(51) Int. Cl.
  *G06T 19/00* (2011.01)
  *H04B 17/391* (2015.01)
  *H04B 17/327* (2015.01)
  *G06T 15/04* (2011.01)
  *G06T 15/08* (2011.01)
  *H04W 16/22* (2009.01)

(52) U.S. Cl.
  CPC ......... *H04B 17/327* (2015.01); *H04B 17/391* (2015.01); *H04L 41/142* (2013.01); *H04W 16/225* (2013.01); *G06T 2210/04* (2013.01); *G06T 2215/16* (2013.01)

(58) Field of Classification Search
  USPC ........................................................ 345/427
  See application file for complete search history.

(56) References Cited

U.S. PATENT DOCUMENTS

| | | | |
|---|---|---|---|
| 2010/0267343 A1 | 10/2010 | Nyu | |
| 2015/0227870 A1* | 8/2015 | Noboa | G06Q 10/0635 705/7.28 |
| 2015/0312696 A1* | 10/2015 | Ribbich | H04W 4/33 455/418 |

FOREIGN PATENT DOCUMENTS

| | | |
|---|---|---|
| CN | 102131214 A | 7/2011 |
| CN | 102364484 A | 2/2012 |
| CN | 103473349 A | 12/2013 |
| CN | 103823976 A | 5/2014 |
| CN | 103927424 A | 7/2014 |
| CN | 104159253 A | 11/2014 |
| CN | 104764173 A | 7/2015 |
| CN | 104766302 A | 7/2015 |
| CN | 104768175 A | 7/2015 |
| CN | 105160080 A | 12/2015 |
| CN | 105163337 A | 12/2015 |
| JP | 2002044034 A | 2/2002 |
| JP | 5392094 B2 | 1/2014 |

OTHER PUBLICATIONS

International Search Report and Written Opinion issued in International Application No. PCT/CN2017/077782 dated Jun. 7, 2017, 21 pages.

Chinese Office Action issued in Chinese Application No. 201610176086.2 dated Mar. 26, 2019, 28 pages.

Office Action issued in Korean Application No. 2018-7030105 dated Mar. 5, 2020, 11 pages (with English translation).

* cited by examiner

SERVICE INDICATOR DISPLAY METHOD AND DEVICE

CROSS-REFERENCE TO RELATED APPLICATIONS

This application is a continuation of International Application No. PCT/CN2017/077782, filed on Mar. 23, 2017, which claims priority to Chinese Patent Application No. 201610176086.2, filed on Mar. 24, 2016. The disclosures of the aforementioned applications are hereby incorporated by reference in their entireties.

TECHNICAL FIELD

Embodiments of this application relate to the communications field, and in particular, to a service indicator display method and device.

BACKGROUND

In a network planning and network optimization service, various types of service data in a wireless network need to be intuitively presented in a visual manner to reflect spatial distribution of communication indicators. This helps a wireless network optimizer learn of network information in more details and identify a problematic area and a valuable area, so as to improve network optimization efficiency.

Currently, two-dimensional presentation is a main stream. As shown in FIG. 1, a building floor is abstracted as a simple three-dimensional shape, and monochrome rendering is performed on the shape. As a result, only a planar service status at a specific height can be reflected, and a presentation granularity is relatively coarse. It is hard to reflect a correlation between services at different heights, and unable to truly reflect spatial distribution of service indicators.

SUMMARY

Embodiments of this application provide a service indicator display method and device, to accurately reflect service distribution at different locations of a building, thereby improving network optimization efficiency.

According to a first aspect, a service indicator display method is provided, including: obtaining measurement values of service indicators in a building, where the measurement values of the service indicators in the building are evenly distributed in three-dimensional space; obtaining a three-dimensional grid model of the building, where an outer surface of the three-dimensional grid model includes multiple polygons; determining, according to the measurement values of the service indicators in the building, a measurement value that is of a service indicator and that is corresponding to a vertex location of each polygon in the multiple polygons; performing gradient rendering on each polygon according to a legend and the measurement value that is of the service indicator and that is corresponding to the vertex location of each polygon, to obtain spatial distribution of the service indicators in the building; and displaying the spatial distribution of the service indicators in the building.

The service indicators in the building include but are not limited to received signal code power (Received Signal Code Power, RSCP), a ratio of energy per modulating bit to the noise spectral density (Ratio of Energy per Modulating bit to the Noise Spectral Density, Ec/Eo), and traffic. The legend is a correspondence between a value interval and a color.

Therefore, according to the service indicator display method in the embodiments of this application, the gradient rendering is performed on each polygon according to the legend and the measurement value that is of the service indicator and that is corresponding to the vertex location of each polygon in the multiple polygons included in the outer surface of the three-dimensional grid model of the building, to obtain the spatial distribution of the service indicators in the building. A surface of a building model is divided more finely by using a polygon, and spatial location distribution of service indicators is reflected more truly by means of gradient rendering, so as to improve network optimization efficiency.

With reference to the first aspect, in a first possible implementation of the first aspect, the obtaining a three-dimensional grid model of the building includes: obtaining a planar two-dimensional vector polygon of the building; extending the planar two-dimensional vector polygon in a vertical direction by using the planar two-dimensional vector polygon as a benchmark, to form K planar vector polygons in the three-dimensional space, where a $k^{th}$ planar vector polygon and a $(k+1)^{th}$ planar vector polygon in the K planar vector polygons are adjacent to each other in a vertical direction, and a height difference between the $k^{th}$ planar vector polygon and the $(k+1)^{th}$ planar vector polygon is a first preset value, $k=1, 2, \ldots, K-1$, and K is a positive integer greater than 1; performing point insertion processing on each side of each planar vector polygon in the K planar vector polygons, where a distance between two adjacent insertion points on each side is a second preset value; constructing an exterior facade polygon by using a boundary point of the $k^{th}$ planar vector polygon, an insertion point on a side of the $k^{th}$ planar vector polygon, a boundary point of the $(k+1)^{th}$ planar vector polygon, and an insertion point on a side of the $(k+1)^{th}$ planar vector polygon as vertexes; and constructing a top polygon by using the boundary point of the $K^{th}$ planar vector polygon, the insertion point on the side of the $K^{th}$ planar vector polygon, and mapping points of the measurement values of the service indicators in the building on a surface of the $K^{th}$ planar vector polygon as vertexes.

The exterior facade polygon may be understood as a spatial polygon, and the top polygon may be understood as a planar polygon.

That is, according to the service indicator display method in the embodiments of this application, the planar two-dimensional vector polygon corresponding to a boundary of the building may be obtained from a 2D vector electronic map. With reference to a height value of the building, the planar two-dimensional vector polygon is extended in a height direction according to a height interval by using the two-dimensional vector polygon as a benchmark, so as to form a boundary polygon at each height layer of the building in the three-dimensional space. Afterwards, point insertion processing is performed on a side of the boundary polygon at each height layer, and polygons are constructed floor by floor, so as to construct the three-dimensional grid model of the building. Rendering presentation is performed on the constructed three-dimensional grid model. Because it is easy to obtain the common 2D vector electronic map, service indicator display can be efficiently implemented at low costs according to the service indicator display method in the embodiments of this application.

With reference to the first possible implementation of the first aspect, in a second possible implementation of the first aspect, the first preset value is measurement precision of the service indicators in the building in a vertical direction; and/or the second preset value is measurement precision of the service indicators in the building in a horizontal direction.

Therefore, service indicator display can be quickly and efficiently implemented while precision of service indicator display is ensured.

With reference to the first possible implementation of the first aspect, in a third possible implementation of the first aspect, a refined model of the building is obtained; and the three-dimensional grid model is obtained according to the refined model.

With reference to the third possible implementation of the first aspect, in a fourth possible implementation of the first aspect, multiple polygons included in an outer surface of the refined model are obtained; and segmentation processing is performed on a polygon that is in the multiple polygons included in the outer surface of the refined model and whose side length is greater than a third preset value or whose area is greater than a fourth preset value, to obtain a polygon obtained after the segmentation processing, where a side length of the polygon obtained after the segmentation processing is less than the third preset value, or an area of the polygon obtained after the segmentation processing is less than the fourth preset value. The polygon obtained after the segmentation processing forms the three-dimensional grid model.

It should be noted that the refined model of the building is a three-dimensional model that can truly reflect a building form and that is processed by using a point cloud technology or is constructed based on information data related to a building project. The refined model of the building usually has a real texture.

That is, according to the service indicator display method in the embodiments of this application, gradient rendering is performed on multiple polygons of an outer surface of a refined model based on the refined model that can truly reflect a real form of a building, so as to implement service presentation. Alternatively, multiple polygons of an outer surface of a refined model may be further segmented to meet a requirement for refined display, so as to reflect actual spatial distribution of service indicators more truly.

Further, the surface of the redefined model has an actual texture. In this case, the existing texture surface of the refined model may be overlaid with another texture for service presentation, so as to facilitate problem analysis with reference to the actual texture and the form of the building, and establish a visual correspondence between a service status and an actual floor.

With reference to any one of the first aspect or the foregoing implementations, in a fifth possible implementation of the first aspect, the obtaining measurement values of service indicators in a building includes: measuring the service indicators in the building by using a wireless network three-dimensional positioning technology.

With reference to any one of the first aspect or the foregoing implementations, in a sixth possible implementation of the first aspect, the determining, according to the measurement values of the service indicators in the building, a measurement value that is of a service indicator and that is corresponding to a vertex location of each polygon in the multiple polygons includes: determining, according to the measurement values of the service indicators in the building and an inverse distance weighted algorithm, the measurement value that is of the service indicator and that is corresponding to the vertex location of each polygon.

With reference to any one of the first aspect or the foregoing implementations, in a seventh possible implementation of the first aspect, the polygon is a triangle.

With reference to any one of the first aspect or the foregoing implementations, in an eighth possible implementation of the first aspect, the method further includes: collecting statistics about heights of the measurement values of the service indicators in the building; performing interpolation processing on measurement values at a same height in the measurement values of the service indicators, to obtain a grid image; performing gradient rendering on the grid image according to the legend, to obtain distribution of service indicators corresponding to each height; and displaying the distribution of the service indicators corresponding to each height.

Based on the foregoing technical characteristics, according to the service indicator display method in the embodiments of this application, an indoor service indicator on a building floor can be displayed, and the service indicator can be viewed in multiple manners.

According to a second aspect, a service indicator display device is provided, where the device is configured to perform the method according to any one of the first aspect or the possible implementations of the first aspect. Specifically, the device includes a unit configured to perform the method according to any one of the first aspect or the possible implementations of the first aspect.

According to a third aspect, a service indicator display device is provided, including a memory and a processor, where the memory is configured to store an instruction, the processor is configured to execute the instruction stored in the memory, and when the processor executes the instruction stored in the memory, the device performs the method according to any one of the first aspect or the possible implementations of the first aspect.

According to a fourth aspect, a computer readable medium is provided, where the computer readable medium is configured to store a computer program, and the computer program includes an instruction used for performing the method according to any one of the first aspect or the possible implementations of the first aspect.

In conclusion, according to the service indicator display method, apparatus, and device, and the computer readable medium in the embodiments of this application, the gradient rendering is performed on each polygon according to the legend and the measurement value that is of the service indicator and that is corresponding to the vertex location of each polygon in the multiple polygons included in the outer surface of the three-dimensional grid model of the building, to obtain the spatial distribution of the service indicators in the building. The surface of the building model is divided more finely by using a polygon, and spatial location distribution of service indicators is reflected more truly by means of gradient rendering, so as to improve network optimization efficiency.

DESCRIPTION OF EMBODIMENTS

The following clearly describes the technical solutions in the embodiments of this application with reference to the accompanying drawings in the embodiments of this application.

A service indicator display method in the embodiments of this application is not only applicable to service indicator presentation in the wireless communication field, but also applicable to presentation of an indicator such as a geomagnetic field, a thermal force, or a sound field.

Figure 1:
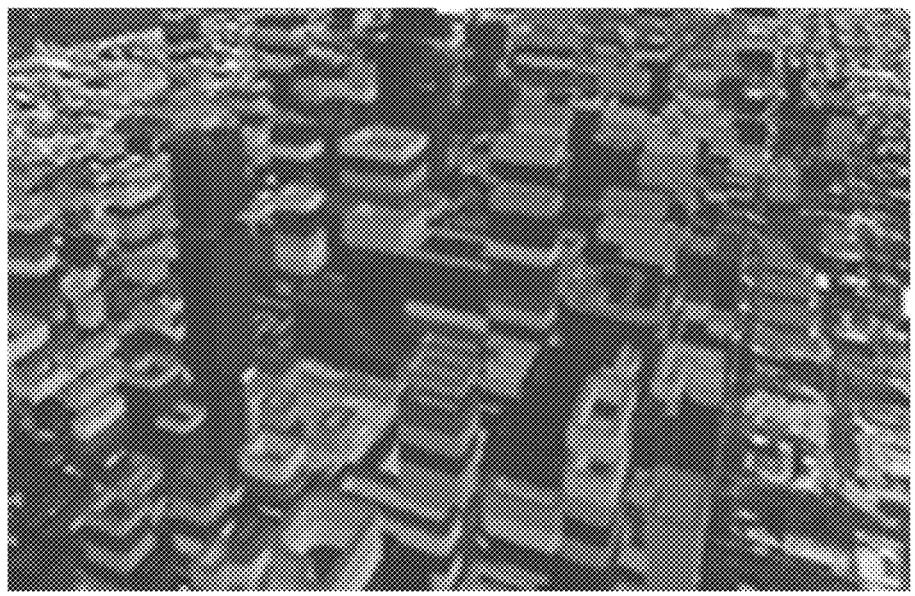
FIG. 1 is an effect drawing of service indicator display in the prior art.
Figure 2:
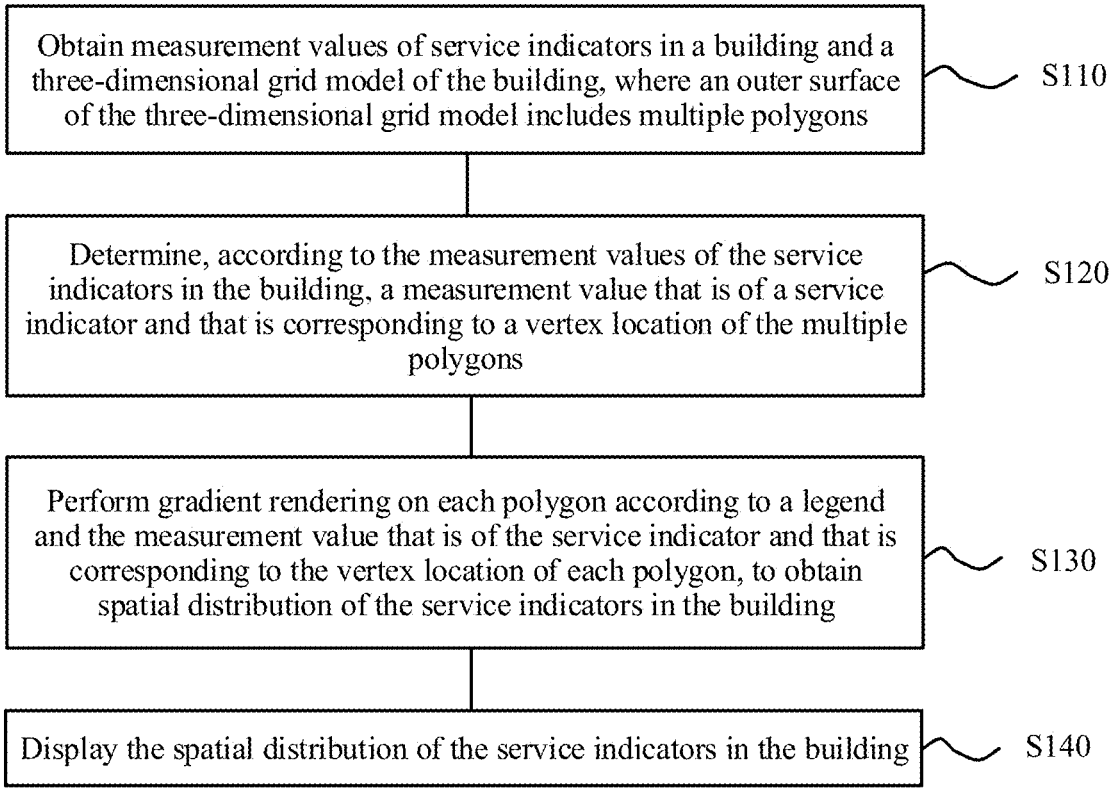
FIG. 2 is a schematic flowchart of a service indicator display method according to an embodiment of this application.

FIG. 2 shows a schematic flowchart of a service indicator display method 100 according to an embodiment of this application. As shown in FIG. 2, the method 100 includes the following steps:

S110. Obtain measurement values of service indicators in a building and a three-dimensional grid model of the building, where an outer surface of the three-dimensional grid model includes multiple polygons.

S120. Determine, according to the measurement values of the service indicators in the building, a measurement value that is of a service indicator and that is corresponding to a vertex location of the multiple polygons.

S130. Perform gradient rendering on each polygon according to a legend and the measurement value that is of the service indicator and that is corresponding to the vertex location of each polygon, to obtain spatial distribution of the service indicators in the building.

S140. Display the spatial distribution of the service indicators in the building.

Therefore, according to the service indicator display method in this embodiment of this application, the gradient rendering is performed on each polygon according to the legend and the measurement value that is of the service indicator and that is corresponding to the vertex location of each polygon in the multiple polygons included in the outer surface of the three-dimensional grid model of the building, to obtain the spatial distribution of the service indicators in the building. A surface of a building model is divided more finely by using a polygon, and spatial location distribution of service indicators is reflected more truly by means of gradient rendering, so as to improve network optimization efficiency.

Optionally, in S110, the service indicators in the building may include received signal code power (Received Signal Code Power, RSCP), a ratio of energy per modulating bit to the noise spectral density (Ratio of Energy per Modulating bit to the Noise Spectral Density, Ec/Eo), traffic, and the like. The service indicator in the building may be measured by using a wireless network three-dimensional positioning technology, and the measurement value of the service indicator reflects a service statistics collection status of a spatial grid unit. Measurement precision of the service indicator may be described from horizontal and vertical dimensions.

Figure 3:
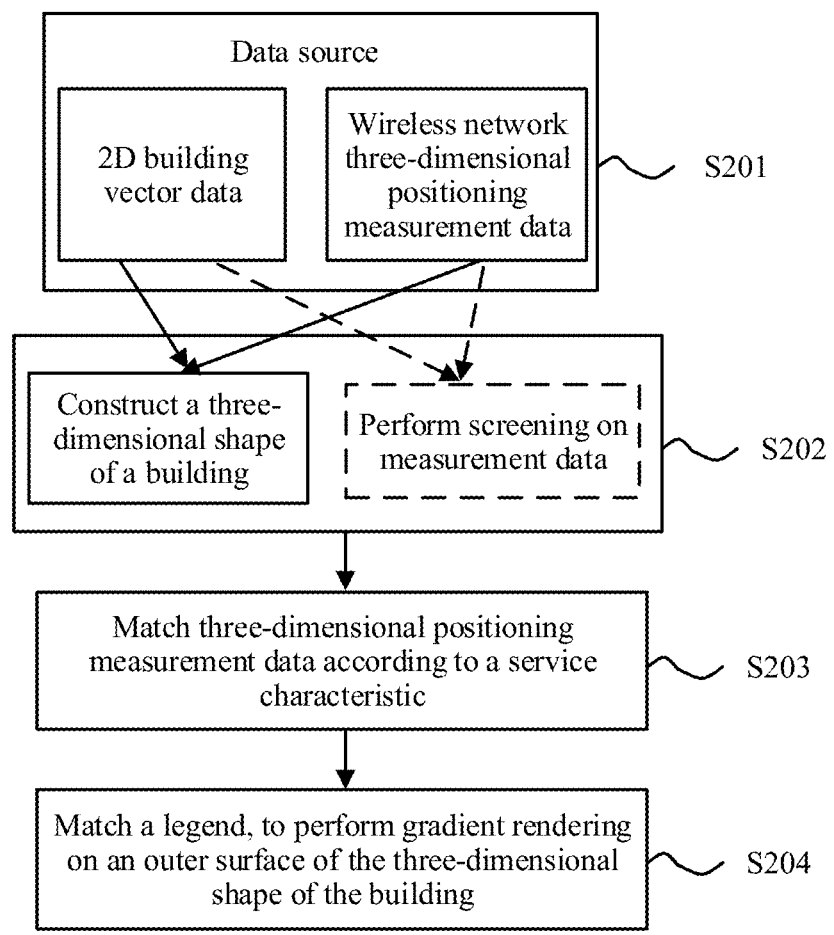
FIG. 3 is a schematic flowchart of a service indicator display method based on a 2D vector electronic map according to an embodiment of this application.

In this embodiment of this application, the service indicator in the building may be presented based on a 2D vector electronic map and with reference to measurement data of the service indicator. Details are shown in FIG. 3. As shown in FIG. 3, a method 200 includes the following steps.

S201. Obtain a data source.

The obtained data source mainly includes 2D building vector data that includes height information and wireless network three-dimensional positioning measurement data.

S202. Determine a measurement value of a service indicator in a building and a three-dimensional shape of the building according to the obtained data source.

Figure 4:
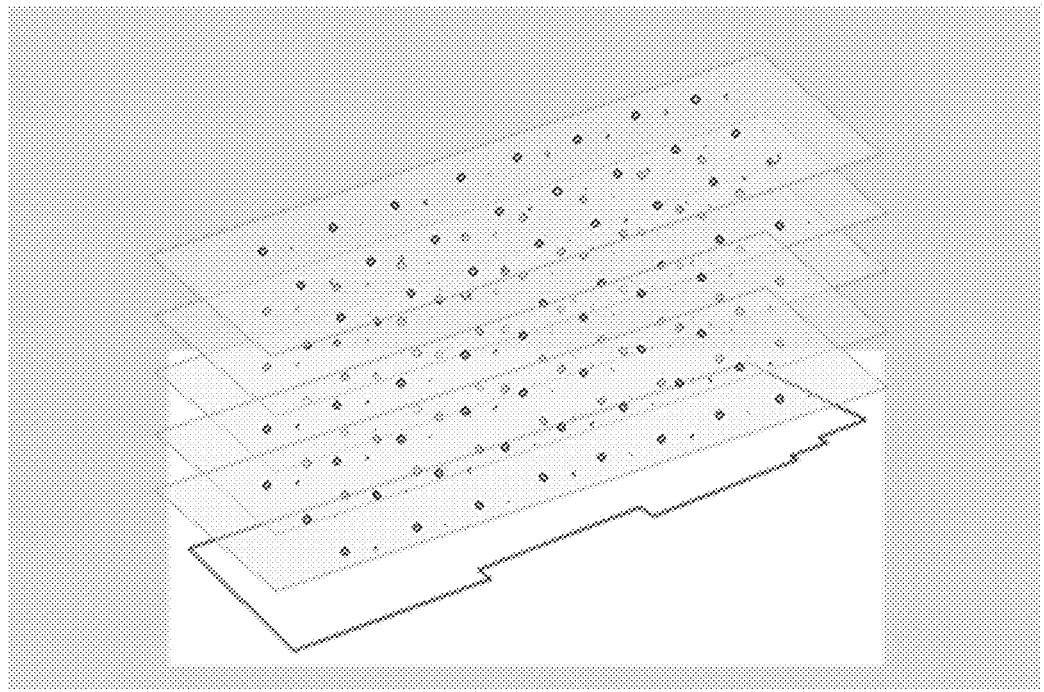
FIG. 4 is a schematic diagram of data screening in the service indicator display method shown in FIG. 3.

Specifically, when the service indicator is measured by using a wireless network three-dimensional positioning technology, service indicators in buildings in an entire area are usually measured together. Therefore, if a service indicator in a building is to be presented, measurement data of the service indicator in the building needs to be first obtained from measurement data of the service indicators by means of screening. Generally, as shown in FIG. 4, screening may be performed on the measurement data of the service indicators by using a polygon corresponding to a building boundary. In FIG. 4, the bottom is a polygon used for screening, and the measurement data of the service indicators that is obtained by means of screening in a polygon range is above the bottom. In the figure, a distribution characteristic of measurement data at different heights is highlighted by using a virtual spatial plane. In a data screening process, height statistics collection may be further performed on the measurement data, so as to put the measurement data to a corresponding height layer.

Screening is performed on the measurement data of the service indicators in the buildings in the entire area, so as to improve matching efficiency of measurement values of service indicators in a single building, and reduce interference from irrelevant data to matching. In addition, a result of the height statistics collection performed on the measurement data of the service indicators may be used as a floor division basis when the three-dimensional shape of the building is determined.

When the three-dimensional shape of the building is constructed, a planar two-dimensional vector polygon corresponding to the building boundary is first selected, and the planar two-dimensional vector polygon is extended to different heights in a vertical direction at an even interval. The even interval may be a manually specified value. Preferably, the even interval is measurement precision of the service indicator in a vertical direction, that is, an interval between height layers that are obtained by means of division when height statistics collection is performed on the measurement data. For example, if there is measurement data at heights of 3 meters, 6 meters, and 9 meters in a result of the height statistics collection, the even interval is 3 meters, that is, height layers are respectively constructed at the heights of 3 meters, 6 meters, and 9 meters.

Figure 5:
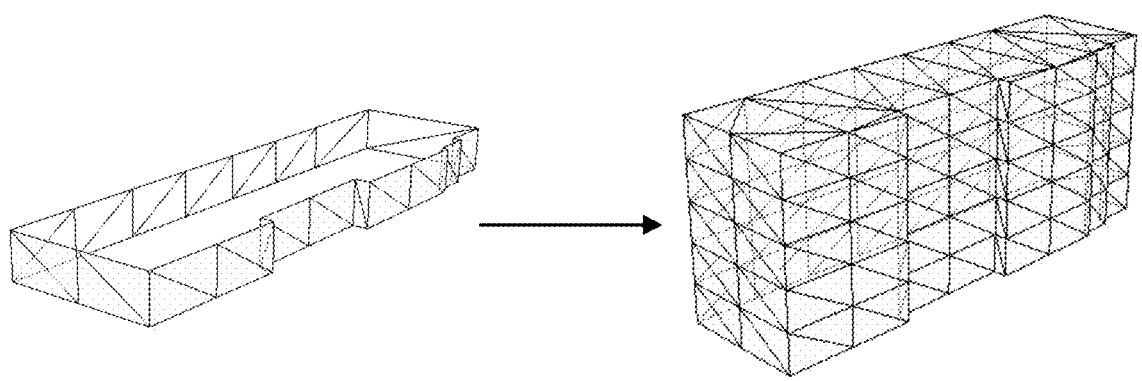
FIG. 5 is a schematic diagram of constructing a three-dimensional shape of a building in the service indicator display method shown in FIG. 3.

Afterwards, point insertion is performed on sides of the planar two-dimensional vector polygons at different heights, and a distance between two adjacent insertion points may be considered as a specified proper value. Preferably, the distance between the two adjacent insertion points may be any value less than or equal to measurement precision of the service indicator in a horizontal direction. For example, if the measurement precision in the horizontal direction is 5 meters, point insertion is performed by using 5 meters as a threshold distance. Next, an exterior facade polygon is constructed by selecting boundary points of planar two-dimensional vector polygons on two adjacent floors in terms of a height and insertion points on sides as vertexes, and the polygons form an outer surface of a three-dimensional shape. For the top of the three-dimensional shape, a top polygon is constructed by using a boundary point of a planar vector polygon on a top floor, an insertion point on a side, and a measurement value point mapped to the top floor (for example, if a height of the building is 10 meters, a measurement value point whose height value approaches a 10-meter height is projected to a surface of the planar two-dimensional vector polygon corresponding to a 10-meter height layer) as vertexes, so as to complete constructing a three-dimensional shape of the entire building, as shown in FIG. 5.

Optionally, the three-dimensional shape of the building may be constructed in a direction from a low height to a high height, or may be constructed in a direction from a high height to a low height. This is not limited in this application.

S203. Match three-dimensional positioning measurement data according to a service characteristic.

Specifically, measurement values of service indicators at locations corresponding to vertexes of the multiple polygons included in the surface of the constructed three-dimensional shape are calculated. Optionally, the measurement values of the service indicators at the locations corresponding to the vertexes of the polygons may be calculated by using an inverse distance weighted algorithm. Specifically, all measurement points $p_i$ of polygon vertexes Pin a specific horizontal radius range may be searched for, and a weight of each measurement point is calculated according to formula (1):

$$\gamma_i = \frac{\frac{1}{d_i}}{\left(\sum_{i=1}^{n} \frac{1}{d_i}\right)}, \quad (1)$$

where a weight is a function of a distance reciprocal, $d_i$ is a Euclidean distance between a measurement point $p_i$ and a vertex P, a measurement value at a location corresponding to the vertex P is $M=\sum_{i=1}^{n}\gamma_i M_i$, and $M_i$ is a measurement value corresponding to the measurement point $p_i$.

A measurement value of a service indicator at a location corresponding to a polygon grid vertex is calculated by using the inverse distance weighted algorithm, so as to fully reflect a change characteristic of spatially continuously distributed values. However, this application is not limited thereto.

S204. Match a legend, to perform gradient rendering on an outer surface of the three-dimensional shape of the building.

Figure 6:
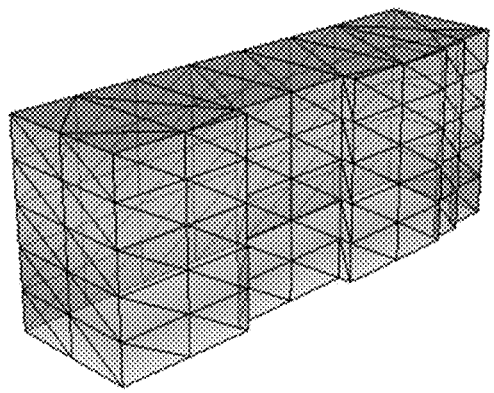
FIG. 6 is an effect drawing of rendering a three-dimensional shape of a building according to the service indicator display method shown in FIG. 3.

The gradient rendering is performed on the polygon according to the legend and the measurement value that is of the vertex of the polygon and that is obtained by means of calculation, so as to complete rendering the three-dimensional shape of the entire building. A final rendering result is shown in FIG. 6.

Figure 7:
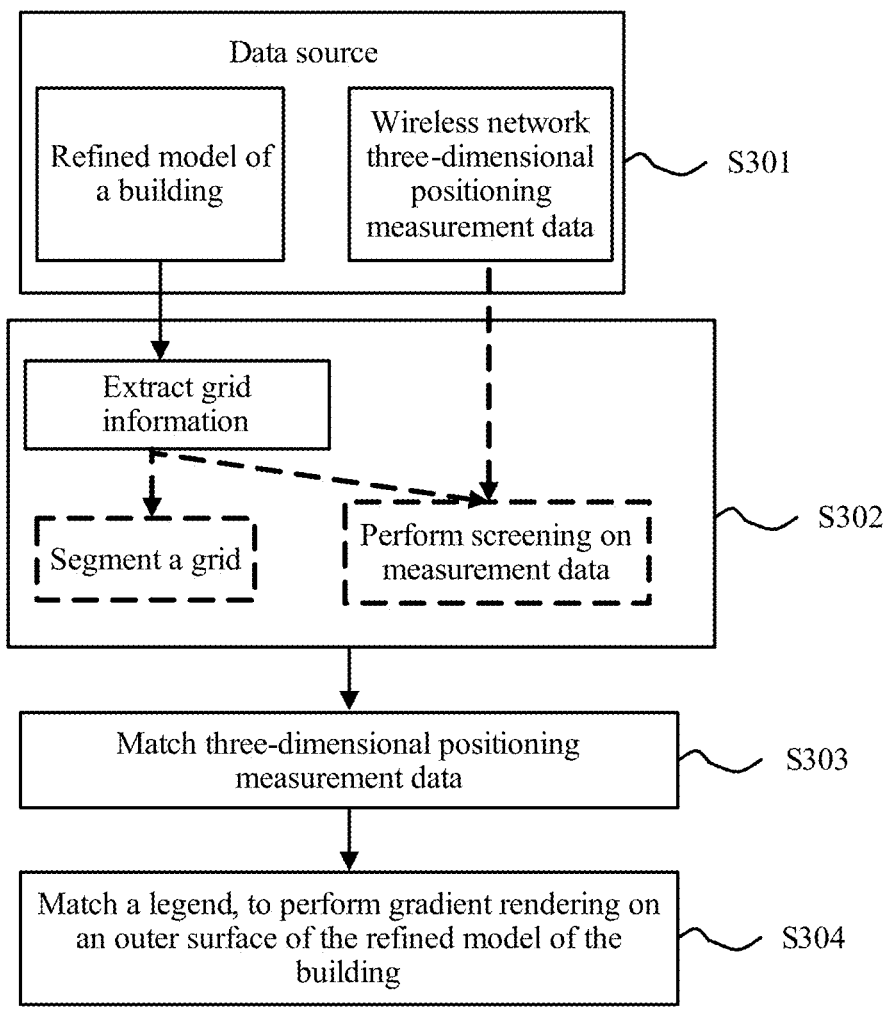
FIG. 7 is a schematic flowchart of a service indicator display method based on a refined model of a building according to an embodiment of this application.

In this embodiment of this application, the service indicators in the building may be presented based on the refined model of the building and with reference to the measurement data of the service indicators. Details are shown in FIG. 7. Description is provided in FIG. 7 by using an example in which the polygon is a triangle. This is only for ease of description, and does not constitute a limitation on the protection range. As shown in FIG. 7, the method 300 includes the following steps:

S301. Obtain a data source.

The obtained data source mainly includes a refined model of a building and wireless network three-dimensional positioning measurement data.

S302. Obtain a three-dimensional grid model according to a refined model.

Figure 8:
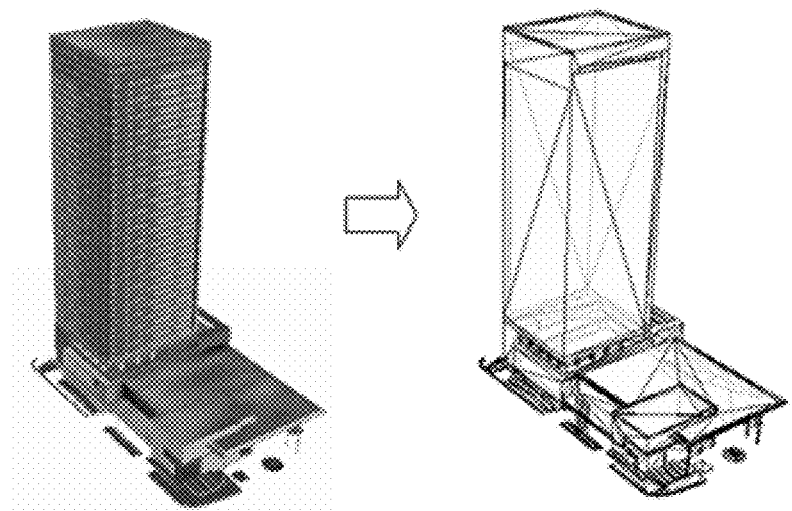
FIG. 8 is a schematic diagram of extracting grid information of a refined model in the service indicator display method shown in FIG. 7.

Specifically, the refined model may be directly parsed, to extract grid information of the refined model, and obtain multiple triangles included in an outer surface of the refined model. Details are shown in FIG. 8.

S303. Determine a measurement value of a service indicator in a building according to the obtained data source.

S304. Match the measurement value of the service indicator.

S305. Match a legend, to perform gradient rendering on an outer surface of the refined model.

Specific practices in S303 to S305 are coincident with related descriptions in S202 to S204. To avoid repetition, details are not described herein again.

Optionally, in S302, the obtained multiple triangles may be segmented. Specifically, segmentation processing is performed on a polygon that is in the multiple polygons included in the outer surface of the refined model and whose side length is greater than a third preset value or whose area is greater than a fourth preset value, to obtain a polygon obtained after the segmentation processing. A side length of the polygon obtained after the segmentation processing is less than the third preset value, or an area of the polygon obtained after the segmentation processing is less than the fourth preset value. The third preset value and the fourth preset value may be considered as any specified proper value, and this depends on a requirement for precision of service indicator presentation. This is not limited in this application.

Figure 9:
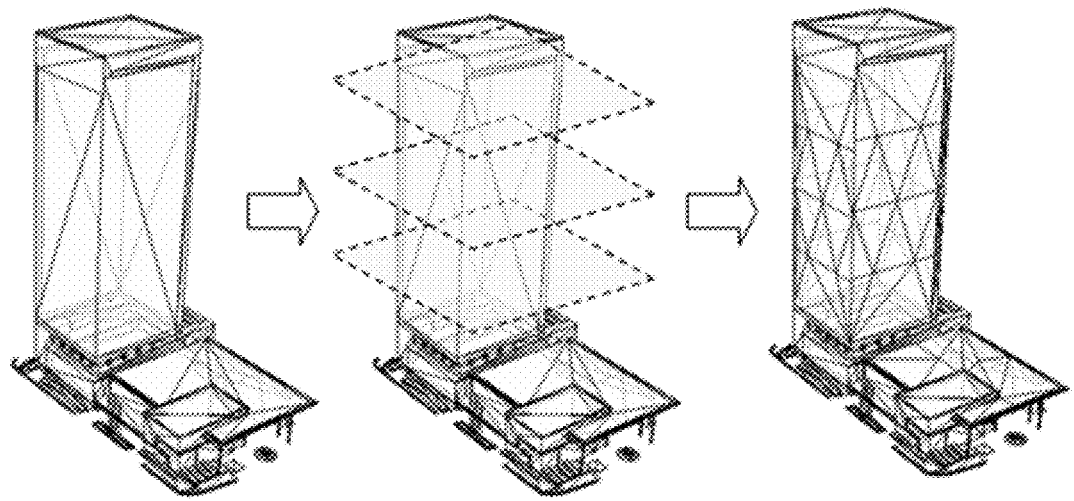
FIG. 9 is a schematic diagram of segmenting an extracted grid in the service indicator display method shown in FIG. 7.

In an example in which the polygon is a triangle, if a side length or an area of a directly extracted triangle is greater than a preset threshold, the triangle may be segmented according to the method shown in FIG. 9. According to a statistics collection result of the service measurement data, the triangle is truncated by using a height layer of service data as a section opposite, and a triangle at each floor is further segmented into smaller structural units by using a preset side length value or a preset area value as a threshold.

Figure 10:
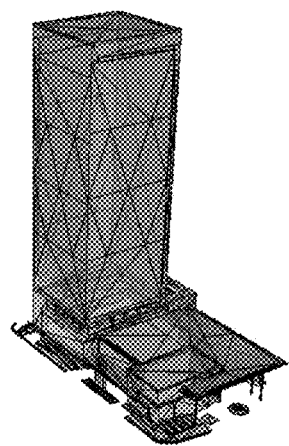
FIG. 10 is an effect drawing of rendering a refined model of a building according to the service indicator display method shown in FIG. 7.
Figure 11:
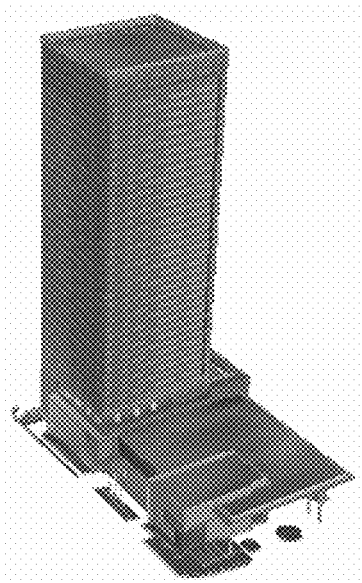
FIG. 11 is an effect drawing of rendering a refined model with a texture of a building according to the service indicator display method shown in FIG. 7.

A result of the gradient rendering performed on the outer surface of the refined model in S305 is shown in FIG. 10. Further, if the refined model has an actual texture, as shown in FIG. 11, the existing texture surface of the refined model may be overlaid with another texture for service indicator presentation, so as to facilitate problem analysis with reference to an actual texture and form of the building, and establish a visual correspondence between a service status and an actual floor.

Figure 12:
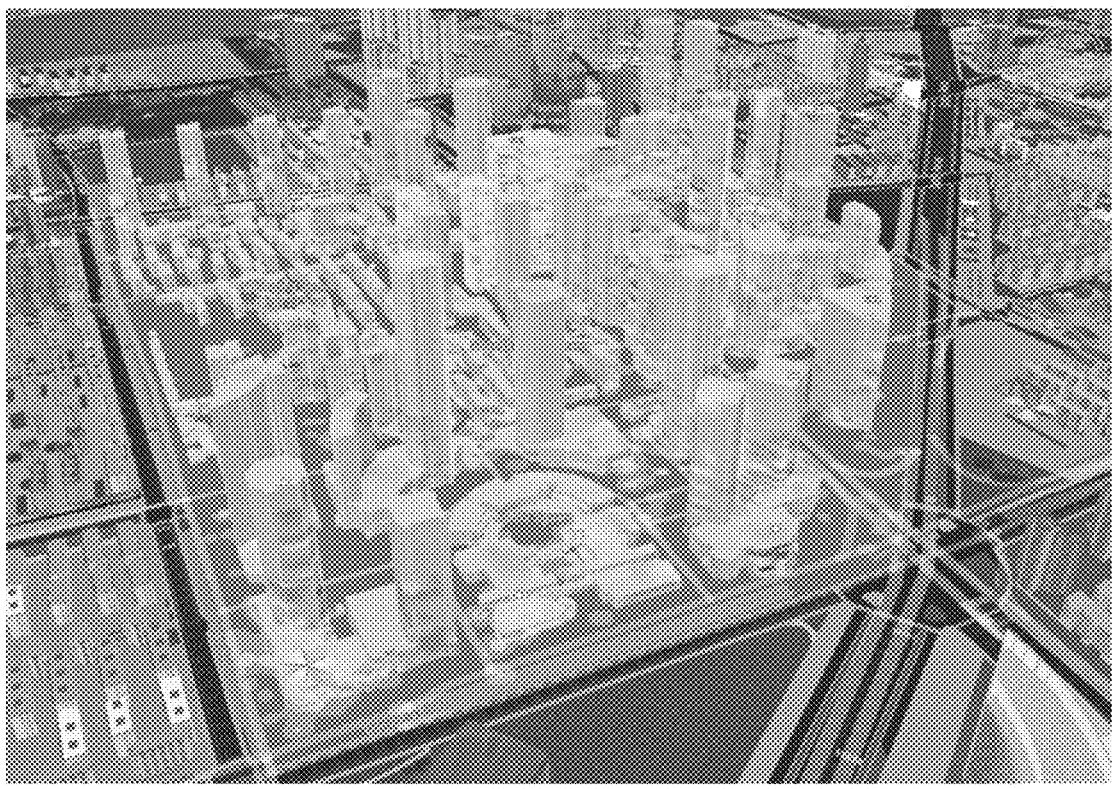
FIG. 12 is an effect drawing of rendering a building model in a to-be-estimated area according to the service indicator display method shown in FIG. 3 or FIG. 7 of this application.

Models of all buildings in a to-be-estimated area are rendered according to the method shown in FIG. 6 and/or FIG. 7, to obtain spatial distribution of service indicators in a range of the entire to-be-estimated area. A specific display effect of service indicators is shown in FIG. 12.

Figure 13:
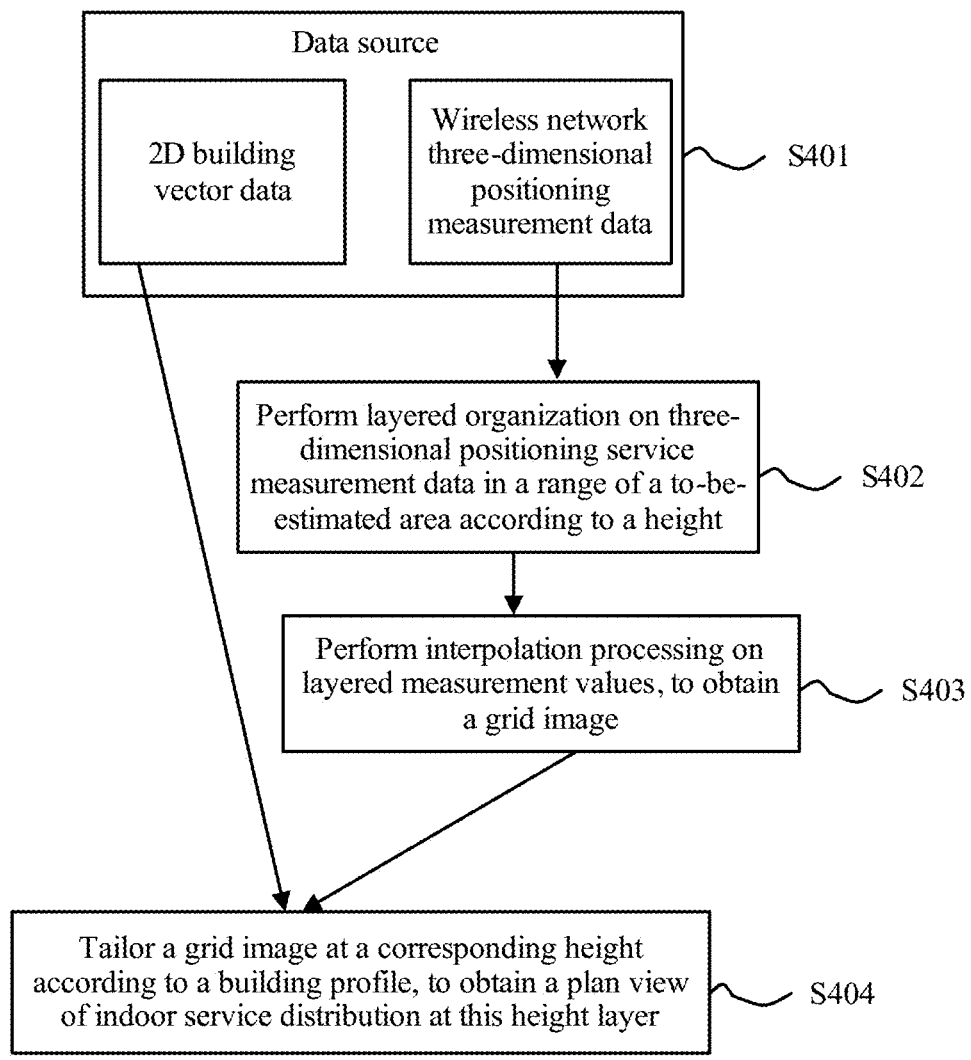
FIG. 13 is a schematic flowchart of a service indicator display method according to an embodiment of this application.

FIG. 13 shows a schematic flowchart of an indoor service indicator display method according to an embodiment of this application. Description is provided in FIG. 13 by using an example in which a range of a to-be-estimated area, and multiple buildings are included in the range of the to-be-estimated area. As shown in FIG. 13, the method 400 includes the following steps:

S401. Obtain a data source.

The data source obtained in S401 is the same as the data source obtained in S201. To avoid repetition, details are not described herein again.

S402. Perform layered organization on three-dimensional positioning service measurement data in a range of a to-be-estimated area according to a height.

Figure 14:
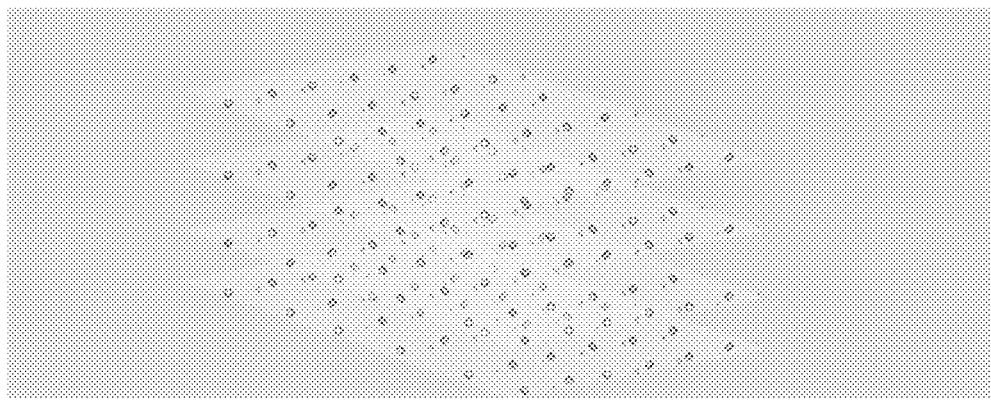
FIG. 14 is a schematic diagram of layered organization of data in the service indicator display method shown in FIG. 13.

That is, measurement data is put to different height layers according to a height value of the three-dimensional positioning service measurement data. Details are shown in FIG. 14.

S403. Perform interpolation processing on layered measurement values, to obtain a grid image.

Figure 15:
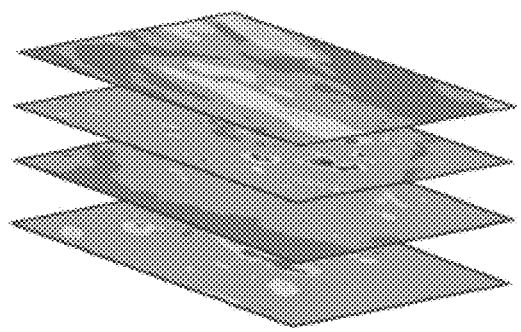
FIG. 15 is a grid image obtained after interpolation processing is performed on layered measurement values of service indicators in FIG. 14.

A specific interpolation method is the same as the foregoing-described method for calculating a measurement value of a service indicator at a location corresponding to a vertex of a polygon. A legend for grid rendering is consistent with the legend for polygon rendering in the foregoing, and a rendering result is shown in FIG. 15. Therefore, it can be ensured that an interior presentation effect matches an exterior presentation effect.

S404. Tailor a grid image at a corresponding height according to a building profile, to obtain a plan view of indoor service distribution at this height layer.

Figure 16:
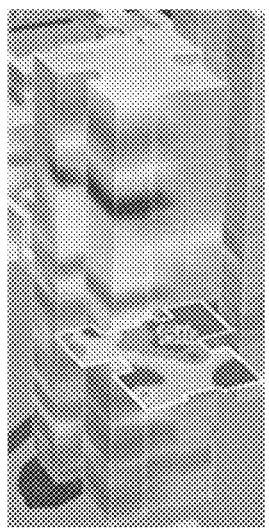
FIG. 16 is an effect drawing of selecting and viewing an indoor service indicator.

Optionally, as shown in FIG. 16, a hotspot building in the range of the to-be-estimated area may be further selected, service distribution on a floor at a specific height layer is selected and viewed, and statistics about floor indicators are collected. Alternatively, a same building is selected, and services on floors at different heights are selected for comparative view or for comparative analysis of distribution of service indicators on different building floors at a same height or on a same floor.

According to the technical solutions of the method 400, an indoor service indicator can be presented and analyzed, so as to implement a manner of interactively viewing distribution of service indicators by means of single-floor selection and multi-floor comparison.

Figure 17:
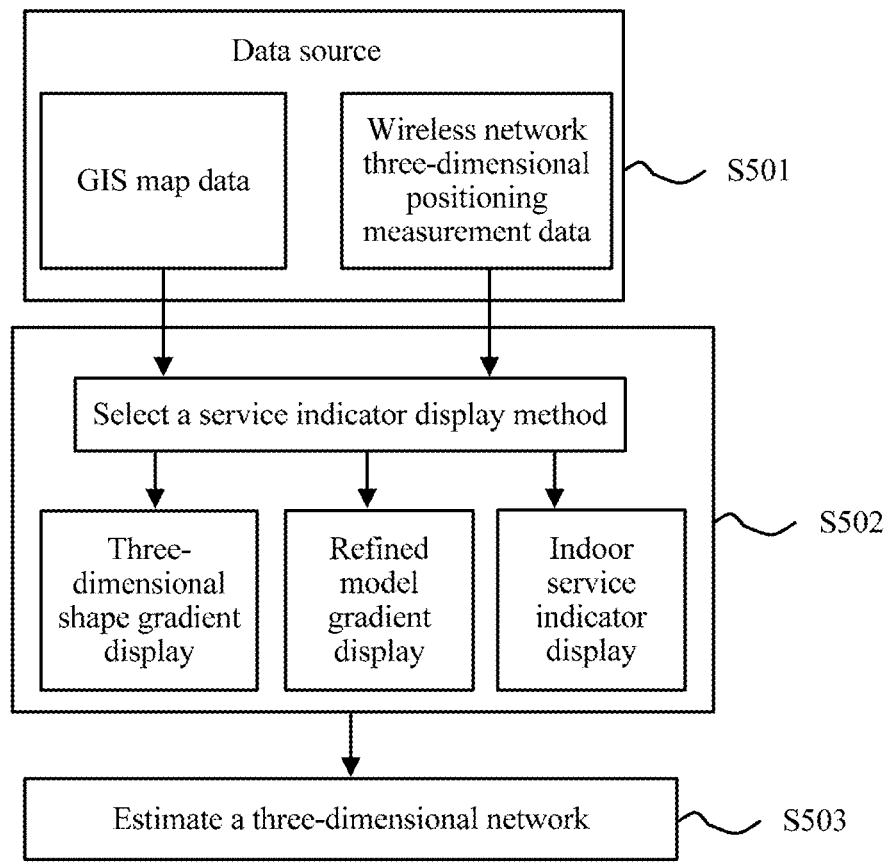
FIG. 17 is a schematic flowchart of a service indicator display method according to another embodiment of this application.

In this embodiment of this application, optionally, the service indicator display method described in the method 200 may be referred to as a three-dimensional shape gradient display method, the service indicator display method described in the method 300 may be referred to as refined model gradient display, and the service indicator display method described in the method 400 may be referred to as an indoor service indicator display method. On this basis, an embodiment of this application further provides an interactive service indicator view method 500. As shown in FIG. 17, the method 500 includes the following steps.

S501. Obtain a data source.

The data source includes geographic information system (Geographic Information System, GIS) map data and measurement data of a service indicator. The GIS map data includes the 2D building vector data and the refined model of the building that are described above, and the measurement data of the service indicator may be obtained in a wireless network three-dimensional positioning manner.

S502. Select a service indicator display method.

Specifically, at least one of a three-dimensional shape gradient display method, a refined model gradient display method, or an indoor service indicator display method may be selected, and specific implementation of each display method is consistent with the foregoing description. To avoid repetition, details are not described herein again.

S503. Estimate a three-dimensional network.

Spatial distribution of service indicators is obtained according to a display result by using a combination of the indoor and the outdoor, so as to help a person skilled in network planning and network optimization estimate the three-dimensional network in an all-round manner, for example, analyze a hotspot area and a valuable area, and screen out a TopN hotspot building and a TopN hotspot floor.

Figure 18:
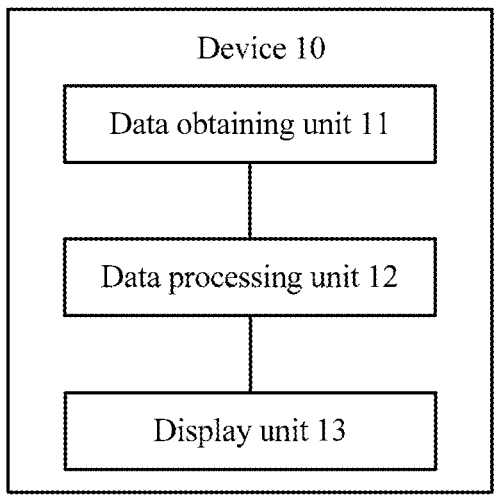
FIG. 18 is a schematic block diagram of a service indicator display device according to an embodiment of this application.

The service indicator display method according to the embodiments of this application is described in detail above with reference to FIG. 2 to FIG. 17. The following describes a service indicator display device according to an embodiment of this application in detail with reference to FIG. 18. As shown in FIG. 18, the service indicator display device 10 includes a data obtaining unit 11, a data processing unit 12, and a display unit 13.

The data obtaining unit 11 is configured to obtain measurement values of service indicators in a building, where the measurement values of the service indicators in the building are evenly distributed in three-dimensional space.

The data obtaining unit 11 is further configured to obtain a three-dimensional grid model of the building, where an outer surface of the three-dimensional grid model includes multiple polygons.

The data processing unit 12 is configured to determine, according to the measurement values of the service indicators in the building, a measurement value that is of a service indicator and that is corresponding to a vertex location of each polygon in the multiple polygons.

The data processing unit 11 is further configured to perform gradient rendering on each polygon according to a legend and the measurement value that is of the service indicator and that is corresponding to the vertex location of each polygon, to obtain spatial distribution of the service indicators in the building.

The display unit 13 is configured to display the spatial distribution of the service indicators in the building.

Therefore, according to the service indicator display device in this embodiment of this application, the gradient rendering is performed on each polygon according to the legend and the measurement value that is of the service indicator and that is corresponding to the vertex location of each polygon in the multiple polygons included in the outer surface of the three-dimensional grid model of the building, to obtain the spatial distribution of the service indicators in the building. A surface of a building model is divided more finely by using a polygon, and spatial location distribution of service indicators is reflected more truly by means of gradient rendering, so as to improve network optimization efficiency.

In this embodiment of this application, optionally, the data obtaining unit 11 is specifically configured to obtain a planar two-dimensional vector polygon of the building.

The data processing unit 12 is further configured to:

extend the planar two-dimensional vector polygon in a vertical direction by using the planar two-dimensional vector polygon as a benchmark, to form K planar vector polygons in the three-dimensional space, where a $k^{th}$ planar vector polygon and a $(k+1)^{th}$ planar vector polygon in the K planar vector polygons are adjacent to each other in a vertical direction, and a height difference between the $k^{th}$ planar vector polygon and the $(k+1)^{th}$ planar vector polygon is a first preset value, k=1, 2, . . . , K−1, and K is a positive integer greater than 1;

perform point insertion processing on each side of each planar vector polygon in the K planar vector polygons, where a distance between two adjacent insertion points on each side is a second preset value;

construct an exterior facade polygon by using a boundary point of the $k^{th}$ planar vector polygon, an insertion point on a side of the $k^{th}$ planar vector polygon, a boundary point of the $(k+1)^{th}$ planar vector polygon, and an insertion point on a side of the $(k+1)^{th}$ planar vector polygon as vertexes; and construct a top polygon by using the boundary point of the $K^{th}$ planar vector polygon, the insertion point on the side of the $K^{th}$ planar vector polygon, and mapping points of the measurement values of the service indicators in the building on a surface of the $K^{th}$ planar vector polygon as vertexes.

In this embodiment of this application, optionally, the first preset value is measurement precision of the service indicators in the building in a vertical direction; and/or the second preset value is measurement precision of the service indicators in the building in a horizontal direction.

In this embodiment of this application, optionally, the data obtaining unit 11 is further configured to: obtain a refined model of the building; and obtain the three-dimensional grid model according to the refined model.

In this embodiment of this application, optionally, the data obtaining unit 11 is specifically configured to obtain multiple polygons included in an outer surface of the refined model.

The data processing unit 12 is further configured to perform segmentation processing on a polygon that is in the multiple polygons included in the outer surface of the refined model and whose side length is greater than a third preset value or whose area is greater than a fourth preset value, to obtain a polygon obtained after the segmentation processing. A side length of the polygon obtained after the segmentation processing is less than the third preset value, or an area of the polygon obtained after the segmentation processing is less than the fourth preset value.

In this embodiment of this application, optionally, the data obtaining unit 12 is specifically configured to measure the service indicators in the building by using a wireless network three-dimensional positioning technology.

In this embodiment of this application, optionally, the data processing unit 12 is specifically configured to: determine, according to the measurement values of the service indicators in the building and an inverse distance weighted algorithm, the measurement value that is of the service indicator and that is corresponding to the vertex location of each polygon.

In this embodiment of this application, optionally, the polygon is a triangle.

In this embodiment of this application, optionally, the data processing unit 12 is further configured to: collect statistics about heights of the measurement values of the service indicators in the building; perform interpolation processing on measurement values at a same height in the measurement values of the service indicators, to obtain a grid image; and perform gradient rendering on the grid image according to the legend, to obtain distribution of service indicators corresponding to each height.

The display unit 13 is further configured to display the distribution of the service indicators corresponding to each height.

It should be understood that the device 10 herein is implemented in a form of a functional unit. A term "unit" herein may be an application-specific integrated circuit (Application Specific Integrated Circuit, ASIC), an electronic circuit, a processor (for example, a shared processor, a dedicated processor, or a group processor) that is configured to execute one or more software or firmware programs, a memory, a merged logic circuit, and/or another proper component supporting the described functions. In an optional example, it may be understood by a person skilled in the art that the device 10 may be configured to perform procedures and/or steps in the method 100 to the method 500 in the method embodiments. To avoid repetition, details are not described herein again.

Figure 19:
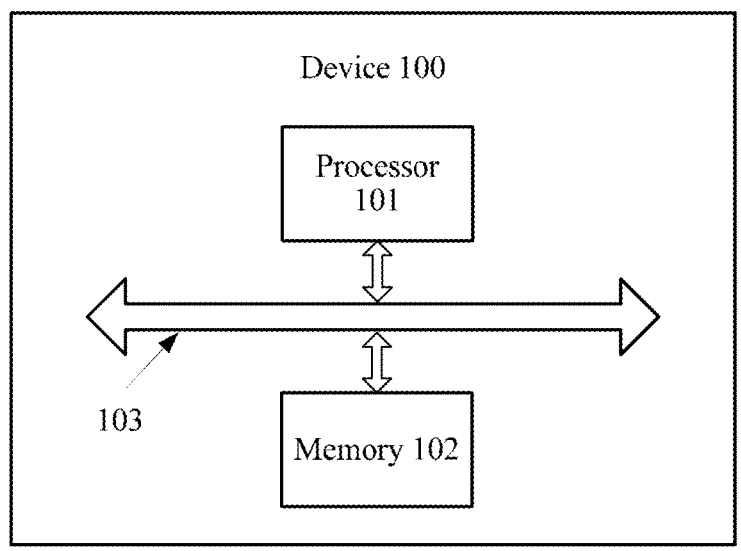
FIG. 19 is a schematic block diagram of a service indicator display device according to another embodiment of this application.

FIG. 19 is a service indicator display device 100 according to still another embodiment of this application. The device 100 includes a processor 101, a memory 102, and a bus system 103. The processor 1011 and the memory 102 are connected by using the bus system 103. The memory 102 is configured to store an instruction, and the processor 101 is configured to execute the instruction stored in the memory 102 to enable the device 100 to perform steps performed by the device in the method 100 to the method 500. For example, The processor 101 is configured to obtain measurement values of service indicators in a building, where the measurement values of the service indicators in the building are evenly distributed in three-dimensional space.

The processor 101 is further configured to obtain a three-dimensional grid model of the building, where an outer surface of the three-dimensional grid model includes multiple polygons.

The processor 101 is further configured to determine, according to the measurement values of the service indicators in the building, a measurement value that is of a service indicator and that is corresponding to a vertex location of each polygon in the multiple polygons.

The processor 101 is further configured to perform gradient rendering on each polygon according to a legend and the measurement value that is of the service indicator and that is corresponding to the vertex location of each polygon, to obtain spatial distribution of the service indicators in the building.

The processor 101 is further configured to display the spatial distribution of the service indicators in the building.

According to the service indicator display device in this embodiment of this application, the gradient rendering is performed on each polygon according to the legend and the measurement value that is of the service indicator and that is corresponding to the vertex location of each polygon in the multiple polygons included in the outer surface of the three-dimensional grid model of the building, to obtain the spatial distribution of the service indicators in the building. A surface of a building model is divided more finely by using a polygon, and spatial location distribution of service indicators is reflected more truly by means of gradient rendering, so as to improve network optimization efficiency.

It should be understood that in this embodiment of this application, optionally, the processor 101 may be a central processing unit (Central Processing Unit, CPU), or the processor 101 may be another general purpose processor, a digital signal processor (Digital Signal Processing, DSP), an application-specific integrated circuit (Application Specific Integrated Circuit, ASIC), a field-programmable gate array (Field-Programmable Gate Array, FPGA) or another programmable logic device, a discrete gate or a transistor logic device, a discrete hardware component, or the like. The general purpose processor may be a microprocessor, or the processor may be any conventional processor, or the like.

Optionally, the processor 101 may be a dedicated processor, and the dedicated processor may include at least one of a baseband processing chip, a radio frequency processing chip, or the like. Further, the dedicated processor may further include a chip having another processing function dedicated to a base station.

The memory 102 may include a read-only memory and a random access memory, and provide an instruction and data for the processor 101. A part of the memory 102 may further include a non-volatile random access memory. For example, the memory 102 may further store information about a device type.

In addition to a data bus, the bus system 103 may further include a power bus, a control bus, a status signal bus, and the like. However, for clarity of description, various buses are marked as the bus system 103 in the figure.

In an implementation process, steps in the foregoing method may be completed by using an integrated logic circuit of hardware in the processor 101 or by using an instruction in a software form. Steps of the method disclosed with reference to embodiments of this application may be directly completed by a hardware processor, or may be completed by using a combination of hardware and software modules in the processor. The software module may be located in a mature storage medium in the art such as a random access memory, a flash memory, a read-only memory, a programmable read-only memory, an electrically-erasable programmable memory, or a register. The storage medium is located in the memory 102. The processor 101 reads information in the memory 102, and completes the steps of the foregoing method with reference to hardware of the processor 101. To avoid repetition, details are not described herein again.

Optionally, in an embodiment, the processor 101 is specifically configured to: obtain a planar two-dimensional vector polygon of the building; extend the planar two-dimensional vector polygon in a vertical direction by using the planar two-dimensional vector polygon as a benchmark, to form K planar vector polygons in the three-dimensional space, where a $k^{th}$ planar vector polygon and a $(k+1)^{th}$ planar vector polygon in the K planar vector polygons are adjacent to each other in a vertical direction, and a height difference between the $k^{th}$ planar vector polygon and the $(k+1)^{th}$ planar vector polygon is a first preset value, k=1, 2, ..., K−1, and K is a positive integer greater than 1; perform point insertion processing on each side of each planar vector polygon in the K planar vector polygons, where a distance between two adjacent insertion points on each side is a second preset value; construct an exterior facade polygon by using a boundary point of the $k^{th}$ planar vector polygon, an insertion point on a side of the $k^{th}$ planar vector polygon, a boundary point of the $(k+1)^{th}$ planar vector polygon, and an insertion point on a side of the $(k+1)^{th}$ planar vector polygon as vertexes; and construct a top polygon by using the boundary point of the $K^{th}$ planar vector polygon, the insertion point on the side of the $K^{th}$ planar vector polygon, and mapping points of the measurement values of the service indicators in the building on a surface of the $K^{th}$ planar vector polygon as vertexes.

Optionally, in an embodiment, the first preset value is measurement precision of the service indicators in the building in a vertical direction; and/or the second preset value is measurement precision of the service indicators in the building in a horizontal direction.

Optionally, in an embodiment, the processor 101 is further configured to: obtain a refined model of the building; and obtain the three-dimensional grid model according to the refined model.

Optionally, in an embodiment, the processor 101 is specifically configured to: obtain multiple polygons included in an outer surface of the refined model; and perform segmentation processing on a polygon that is in the multiple polygons included in the outer surface of the refined model and whose side length is greater than a third preset value or whose area is greater than a fourth preset value, to obtain a polygon obtained after the segmentation processing. A side length of the polygon obtained after the segmentation processing is less than the third preset value, or an area of the polygon obtained after the segmentation processing is less than the fourth preset value.

Optionally, in an embodiment, the processor 101 is specifically configured to measure the service indicators in the building by using a wireless network three-dimensional positioning technology.

Optionally, in an embodiment, the processor 101 is specifically configured to: determine, according to the measurement values of the service indicators in the building and an inverse distance weighted algorithm, the measurement value that is of the service indicator and that is corresponding to the vertex location of each polygon.

Optionally, in an embodiment, the polygon is a triangle.

Optionally, in an embodiment, the processor 101 is further configured to: collect statistics about heights of the measurement values of the service indicators in the building; perform interpolation processing on measurement values at a same height in the measurement values of the service indicators, to obtain a grid image; and perform gradient rendering on the grid image according to the legend, to obtain distribution of service indicators corresponding to each height.

It should be understood that the device 100 according to this embodiment of this application may be corresponding to the device 10 according to the embodiment of this application, and the foregoing and other operations and/or functions of the modules in the device 100 separately aim to implement corresponding procedures in the method 100 to the method 500. For clarity, details are not described herein again.

According to the service indicator display device in this embodiment of this application, the gradient rendering is performed on each polygon according to the legend and the measurement value that is of the service indicator and that is corresponding to the vertex location of each polygon in the multiple polygons included in the outer surface of the three-dimensional grid model of the building, to obtain the spatial distribution of the service indicators in the building. A surface of a building model is divided more finely by using a polygon, and spatial location distribution of service indicators is reflected more truly by means of gradient rendering, so as to improve network optimization efficiency.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service indicator display method, comprising:
   obtaining measurement values of service indicators in a building, wherein the measurement values of the service indicators in the building are evenly distributed in a three-dimensional space, the service indicators being indicative of signal strength;
   obtaining a three-dimensional grid model of the building, wherein an outer surface of the three-dimensional grid model comprises multiple polygons;
   determining, according to the measurement values of the service indicators in the building, a measurement value of a service indicator for each of the multiple polygons;
   performing gradient rendering on each of the multiple polygons according to a legend and the measurement value of the respective polygon, to obtain spatial distribution of the service indicators in the building; and
   displaying the spatial distribution of the service indicators in the building.

2. The method according to claim 1, wherein the obtaining the three-dimensional grid model of the building comprises:
   obtaining a planar two-dimensional vector polygon of the building;
   extending the planar two-dimensional vector polygon in a vertical direction by using the planar two-dimensional vector polygon as a benchmark, to form K planar vector polygons in the three-dimensional space, wherein a $k^{th}$ planar vector polygon and a $(k+1)^{th}$ planar vector polygon in the K planar vector polygons are adjacent to each other in a vertical direction, and a height difference between the $k^{th}$ planar vector polygon and the $(k+1)^{th}$ planar vector polygon is a first preset value, wherein k=1, 2, . . . , K−1, and wherein K is a positive integer greater than 1;
   performing point insertion processing on each side of each planar vector polygon in the K planar vector polygons, wherein a distance between two adjacent insertion points on each side is a second preset value;
   constructing an exterior facade polygon by using a boundary point of the $k^{th}$ planar vector polygon, an insertion point on a side of the $k^{th}$ planar vector polygon, a boundary point of the $(k+1)^{th}$ planar vector polygon, and an insertion point on a side of the $(k+1)^{th}$ planar vector polygon as vertexes; and
   constructing a top polygon by using the boundary point of the $K^{th}$ planar vector polygon, the insertion point on the side of the $K^{th}$ planar vector polygon, and mapping points of the measurement values of the service indicators in the building on a surface of the $K^{th}$ planar vector polygon as vertexes.

3. The method according to claim 2, wherein at least one of the following is true:
   the first preset value is a measurement precision of the service indicators in the building in a vertical direction; or
   the second preset value is a measurement precision of the service indicators in the building in a horizontal direction.

4. The method according to claim 1, wherein the obtaining the three-dimensional grid model of the building comprises:
   obtaining a refined model of the building; and
   obtaining the three-dimensional grid model according to the refined model.

5. The method according to claim 4, wherein the obtaining the three-dimensional grid model according to the refined model comprises:
obtaining multiple polygons that are included in an outer surface of the refined model; and
performing segmentation processing on a polygon that is in the multiple polygons, wherein a side length of the polygon is greater than a third preset value or an area of the polygon is greater than a fourth preset value, to obtain a post-segmentation-processing polygon, wherein a side length of the post-segmentation-processing polygon is less than the third preset value or an area of the post-segmentation-processing polygon is less than the fourth preset value.

6. The method according to claim 1, wherein the obtaining measurement values of service indicators in the building comprises:
measuring the service indicators in the building by using a wireless network three-dimensional positioning technology.

7. The method according to claim 1, wherein the determining, according to the measurement values of the service indicators in the building, the measurement value of the service indicator for each of the multiple polygons comprises:
determining, according to the measurement values of the service indicators in the building and an inverse distance weighted algorithm, the measurement value of the service indicator for each of the multiple polygons.

8. The method according to claim 1, wherein at least one of the multiple polygons is a triangle.

9. The method according claim 1, wherein the method further comprises:
collecting statistics about heights of the measurement values of the service indicators in the building;
performing interpolation processing on measurement values at a same height in the measurement values of the service indicators, to obtain a grid image;
performing gradient rendering on the grid image according to the legend, to obtain a distribution of service indicators corresponding to each height; and
displaying the distribution of the service indicators corresponding to each height.

10. A service indicator display device, comprising:
a non-transitory memory storage comprising instructions; and
one or more hardware processors in communication with the non-transitory memory storage, wherein the one or more hardware processors execute the instructions to:
obtain measurement values of service indicators in a building, wherein the measurement values of the service indicators in the building are evenly distributed in a three-dimensional space, the service indicators being indicative of signal strength;
obtain a three-dimensional grid model of the building, wherein an outer surface of the three-dimensional grid model comprises multiple polygons;
determine, according to the measurement values of the service indicators in the building, a measurement value of a service indicator for each of the multiple polygons; wherein
perform gradient rendering on each of the multiple polygons according to a legend and the measurement value of the respective polygon, to obtain spatial distribution of the service indicators in the building; and
a display unit, configured to display the spatial distribution of the service indicators in the building.

11. The device according to claim 10, wherein the one or more hardware processors execute the instructions to:
obtain a planar two-dimensional vector polygon of the building;
extend the planar two-dimensional vector polygon in a vertical direction by using the planar two-dimensional vector polygon as a benchmark, to form K planar vector polygons in the three-dimensional space, wherein a $k^{th}$ planar vector polygon and a $(k+1)^{th}$ planar vector polygon in the K planar vector polygons are adjacent to each other in a vertical direction, and a height difference between the $k^{th}$ planar vector polygon and the $(k+1)^{th}$ planar vector polygon is a first preset value, wherein k=1, 2, . . . , K−1, and wherein K is a positive integer greater than 1;
perform point insertion processing on each side of each planar vector polygon in the K planar vector polygons, wherein a distance between two adjacent insertion points on each side is a second preset value;
construct an exterior facade polygon by using a boundary point of the $k^{th}$ planar vector polygon, an insertion point on a side of the $k^{th}$ planar vector polygon, a boundary point of the $(k+1)^{th}$ planar vector polygon, and an insertion point on a side of the $(k+1)^{th}$ planar vector polygon as vertexes; and
construct a top polygon by using the boundary point of the $K^{th}$ planar vector polygon, the insertion point on the side of the $K^{th}$ planar vector polygon, and mapping points of the measurement values of the service indicators in the building on a surface of the $K^{th}$ planar vector polygon as vertexes.

12. The device according to claim 11, wherein at least one of the following is true:
the first preset value is a measurement precision of the service indicators in the building in a vertical direction; or
the second preset value is a measurement precision of the service indicators in the building in a horizontal direction.

13. The device according to claim 10, wherein the one or more hardware processors execute the instructions to:
obtain a refined model of the building; and
obtain the three-dimensional grid model according to the refined model.

14. The device according to claim 13, wherein the one or more hardware processors execute the instructions to:
obtain multiple polygons that are included in an outer surface of the refined model; and
perform segmentation processing on a polygon that is in the multiple polygons, wherein a side length of the polygon is greater than a third preset value or an area of the polygon is greater than a fourth preset value, to obtain a post-segmentation-processing polygon, wherein a side length of the post-segmentation-processing polygon is less than the third preset value or an area of the post-segmentation-processing polygon is less than the fourth preset value.

15. The device according to claim 10, wherein the one or more hardware processors execute the instructions to:
measure the service indicators in the building by using a wireless network three-dimensional positioning technology.

16. The device according to claim 10, wherein the one or more hardware processors execute the instructions to:
determine, according to the measurement values of the service indicators in the building and an inverse distance weighted algorithm, the measurement value of the service indicator for each of the multiple polygons.

17. The device according to claim 10, wherein at least one of the multiple polygons is a triangle.

18. The device according to claim 10, wherein the one or more hardware processors execute the instructions to:
    collect statistics about heights of the measurement values of the service indicators in the building;
    perform interpolation processing on measurement values at a same height in the measurement values of the service indicators, to obtain a grid image; and
    perform gradient rendering on the grid image according to the legend, to obtain distribution of service indicators corresponding to each height; and
    the display unit is further configured to:
    display the distribution of the service indicators corresponding to each height.

19. A non-transitory computer-readable medium storing computer instructions, that when executed by one or more hardware processors, cause a service indicator display device to perform operations comprising:
    obtaining measurement values of service indicators in a building, wherein the measurement values of the service indicators in the building are evenly distributed in a three-dimensional space, the service indicators being indicative of signal strength;
    obtaining a three-dimensional grid model of the building, wherein an outer surface of the three-dimensional grid model comprises multiple polygons;
    determining, according to the measurement values of the service indicators in the building, a measurement value of a service indicator for each of the multiple polygons;
    performing gradient rendering on each of the multiple polygons according to a legend and the measurement value of the respective polygon, to obtain spatial distribution of the service indicators in the building; and
    displaying the spatial distribution of the service indicators in the building.

20. The non-transitory computer-readable medium according to claim 19, wherein the operations further comprises:
    obtaining a planar two-dimensional vector polygon of the building;
    extending the planar two-dimensional vector polygon in a vertical direction by using the planar two-dimensional vector polygon as a benchmark, to form K planar vector polygons in the three-dimensional space, wherein a $k^{th}$ planar vector polygon and a $(k+1)^{th}$ planar vector polygon in the K planar vector polygons are adjacent to each other in a vertical direction, and a height difference between the $k^{th}$ planar vector polygon and the $(k+1)^{th}$ planar vector polygon is a first preset value, wherein k=1, 2, . . . , K−1, and wherein K is a positive integer greater than 1;
    performing point insertion processing on each side of each planar vector polygon in the K planar vector polygons, wherein a distance between two adjacent insertion points on each side is a second preset value;
    constructing an exterior facade polygon by using a boundary point of the $k^{th}$ planar vector polygon, an insertion point on a side of the $k^{th}$ planar vector polygon, a boundary point of the $(k+1)^{th}$ planar vector polygon, and an insertion point on a side of the $(k+1)^{th}$ planar vector polygon as vertexes; and
    constructing a top polygon by using the boundary point of the $K^{th}$ planar vector polygon, the insertion point on the side of the $K^{th}$ planar vector polygon, and mapping points of the measurement values of the service indicators in the building on a surface of the $K^{th}$ planar vector polygon as vertexes.

* * * * *

UNITED STATES PATENT AND TRADEMARK OFFICE
CERTIFICATE OF CORRECTION

PATENT NO. : 10,742,518 B2
APPLICATION NO. : 16/138482
DATED : August 11, 2020
INVENTOR(S) : Junliang Chen, Jun Zhang and Chao Wang It is certified that error appears in the above-identified patent and that said Letters Patent is hereby corrected as shown below:

In the Claims

In Column 17, Line 32, in Claim 9, delete "according" and insert -- according to --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*